(No Model.)
H. P. RANGER.
MIRROR FOR USE IN PHOTOGRAPHY.
No. 505,127. Patented Sept. 19, 1893.
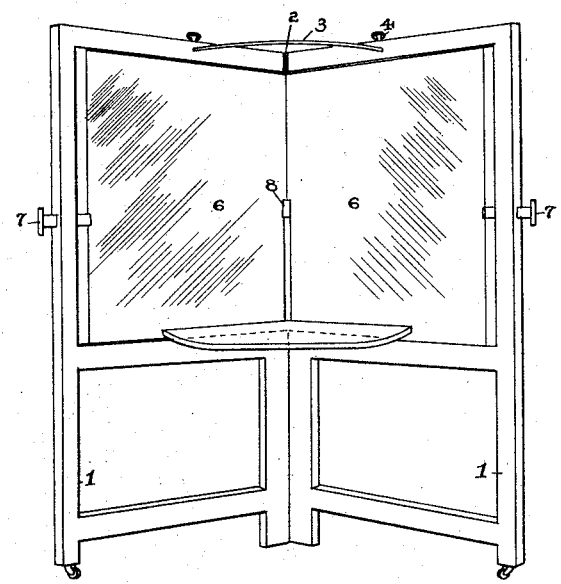
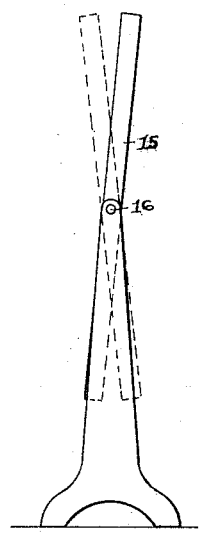
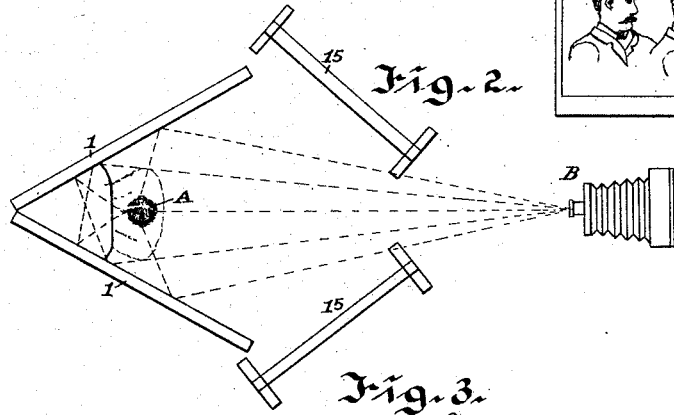
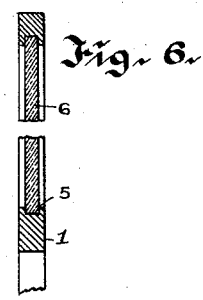
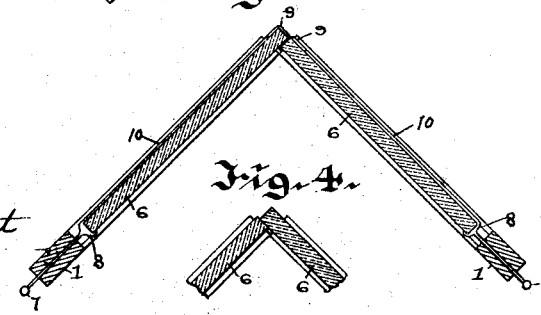
Witnesses
Thomas Durant
Anna M. Kelly
Inventor
Henry P. Ranger
by Church & Church
his Attys

UNITED STATES PATENT OFFICE.

HENRY P. RANGER, OF ROCHESTER, NEW YORK.

MIRROR FOR USE IN PHOTOGRAPHY.

SPECIFICATION forming part of Letters Patent No. 505,127, dated September 19, 1893.

Application filed May 18, 1893. Serial No. 474,701. (No model.)

*To all whom it may concern:*

Be it known that I, HENRY P. RANGER, of Rochester, in the county of Monroe and State of New York, have invented certain new and useful Improvements in Mirrors for Use in Photography; and I do hereby declare the following to be a full, clear, and exact description of the same, reference being had to the accompanying drawings, and to the reference letters and numerals marked thereon.

My present invention has for its object to provide an improved mirror especially adapted for use in photography, whereby several views or poses of a subject may be made with a single exposure, though adapted for other uses, and it consists in certain improvements in construction and combinations of parts, all as will be hereinafter fully described and the novel features pointed out in the claims at the end of this specification.

In the drawings: Figure 1 is a front view of a mirror constructed in accordance with my invention; Fig. 2, a diagrammatic or plan view showing the manner of using my invention; Figs. 3 and 4, horizontal sectional views of the mirrors; Fig. 5, a side view of a screen which I prefer to use in connection with my mirror; Fig. 6, a vertical sectional view of the mirror; Fig. 7, an outline of the photographic picture produced by the use of my invention.

Similar reference letters and numerals in the several figures indicate similar parts.

In carrying out my invention I provide two frames 1, 1, preferably resting on the ground, hinged together at 2 and provided at the top with a segmental rod or plate 3 passing through apertures in the frame and secured by means of set screws 4, for the purpose of regulating the angle the parts 1, 1 maintain to each other. These frames are provided with grooves 5 open at their rear ends in which are arranged large plate-glass mirrors 6 capable of being adjusted toward the pivot of the frame in said grooves, so that the edges of the mirrors may be brought in contact at the rear or converging point, when the parts of the frame have been adjusted to the positions desired with relation to each other. Secured to each of the mirrors is a handle 7 for the purpose of moving them in the frames; said handle being provided with a plate 8 engaging the front edge of the mirror and at the rear end the corresponding plate 9 gripping this edge and connected to the handle by one or more rods or wires 10, as shown in Fig. 3.

When it is desired to take a picture, the person or subject indicated by A is placed in the angle formed by the two mirrors, as in Fig. 1, with his back to the camera indicated by B, which latter is substantially midway of the angle formed by the mirrors and the exposure is made in the usual manner. With the mirrors arranged at approximately the angles shown, there will be received in the camera the direct image from the back of the subject A and the angle of incidence being equal to the angle of reflection, two reflections from each of the mirrors of the subject, one the direct reflection from either side of the subject and the other the reflection in each mirror from the reflection in the other, as indicated by the lines Fig. 2, making the single picture substantially as outlined in Fig. 7. Of course a line indicating the juncture of the mirrors will appear in the negative and it is in order that this line may be reduced to a minimum that the mirrors are independently adjustable in the pivoted frames, as the glass of mirrors suitable for this purpose has an appreciable thickness, and they may be arranged as shown in Fig. 3, or in Fig. 4, depending on the direction from which the light comes and the line thus formed in the negative may be readily obliterated by retouching and the whole background made homogeneous. In order also that no difference may be made in the shade of the background reflected in the two mirrors, I employ screens 15, preferably of a solid light color, pivoted on a horizontal axis 16, and arranged substantially parallel with the mirrors. As the light in photographic studios comes from above and generally from one side, the screens 15 may be so tilted as that the reflection of the background reflected in the camera will be substantially uniform in shade. By this method of procedure a single exposure of a subject placed between the mirrors and giving a plurality of views will serve for the making of busts or statues without the necessity of making several exposures from different standpoints, the pictures of which might be of different sizes. By arranging a small table or plate in front of the subject between the mirrors a picture apparently of five persons, playing cards for instance, might be made by a single exposure.

It will be seen that neither the camera, nor the operator, will be reflected in the mirrors, so as to show in the picture, and the adjustable screens 15 will give a background of a solid and uniform color, so that the line formed at the juncture of the mirrors may be readily removed by retouching the negative.

By decreasing the angle of the mirrors the number of reflections can be increased, as will be understood.

Even if the two frames were not hinged together, but were secured rigidly at right angles for instance, it will be seen that the independent adjustment of the mirrors in the grooves in the frames will enable said mirrors to be moved to assume either the position shown in Fig. 3 or that in Fig. 4 for the purpose of having the line of division appearing in the negative as small as possible.

I claim as my invention—

1. The combination with the mirror frame having the ways arranged at an angle, of the mirrors independently and longitudinally movable in said ways, substantially as and for the purpose set forth.

2. The combination with the frame composed of two parts hinged together and open at their proximate sides, of the mirrors independently movable in said frames, substantially as described.

3. The combination with the frame composed of two parts hinged together and having the grooves or ways therein open at their proximate sides, of the mirrors independently movable in the grooves in the frames and having the handles for moving them, substantially as described.

HENRY P. RANGER.

Witnesses:
WM. M. FURLONG,
FRED F. CHURCH.